United States Patent [19]

Jones

[11] 3,916,357

[45] Oct. 28, 1975

[54] DEVICE FOR REDUCING TARNISH AND CORROSION BUILD-UP IN TELEVISION TUNERS

[76] Inventor: Harold W. Jones, 829 Ridgecrest Drive, Bowling Green, Ky. 42101

[22] Filed: Mar. 15, 1973

[21] Appl. No.: 333,563

[52] U.S. Cl. .................... 334/47; 15/70; 15/256.5; 334/50

[51] Int. Cl.$^2$ .................... H03J 5/00

[58] Field of Search .................... 334/47, 78, 50, 70, 71; 15/70, 71, 256.5; 317/253

[56] References Cited

UNITED STATES PATENTS

| | | | |
|---|---|---|---|
| 1,673,005 | 6/1928 | Gargan | 317/253 |
| 1,763,554 | 6/1930 | Dubilier | 317/253 |
| 2,719,204 | 9/1955 | Brown | 334/47 |
| 2,750,479 | 6/1956 | Guboff | 334/47 |
| 2,868,982 | 1/1959 | Carlson | 334/78 X |
| 3,613,149 | 10/1971 | Gurkin | 334/47 |
| 3,729,768 | 5/1973 | Gurkin | 334/50 |

*Primary Examiner*—Saxfield Chatmon, Jr.

[57] ABSTRACT

This invention relates to a means of reducing tarnish build-up on the stator contacts of a television tuner which utilizes a rotating barrel in channel selection. This tarnish results in an intermittent performance of the tuner and produces a snowy intermittent picture on the television set. This invention overcomes this intermittent performance due to tarnish build-up on the stator contacts by a cleaning action that takes place as channels are changed. This cleaning action takes place by means of a felt strip which is inserted in the rotating barrel and utilizes the space of an individual channel strip. Said felt strip brushes against the stator strips when the tuner is rotated thereby cleaning the stator strips.

2 Claims, 3 Drawing Figures

DEVICE FOR REDUCING TARNISH AND CORROSION BUILD-UP IN TELEVISION TUNERS

This invention is applicable to television tuners utilizing a rotating barrel or drum in channel selection and provides a means of self-cleaning for the stator contacts (strips) of the television tuner.

One type of television tuner utilizes a barrel which is made up of individual strips, each strip is tuned to a specific television channel frequency.

Small contact points on the strips connect to the ends of coil windings on the strips. These coils affect the tuning frequencies of the strips and thereby determine a specific television channel.

As the barrel is rotated, a channel strip is placed, or more specifically, the contact points on the strip are placed against small metal strips called stator contacts, that serve to connect the circuitry part of the tuner to the specific tuner strip of a desired channel.

Over a period of time, these stator contacts become corroded, tarnished or oxidized to a degree that the stator contacts and points on the channel strips do not make good electrical connection and this condition causes the tuner to become intermittent. To the television viewer, this intermittent condition would cause the picture and sound to come and go, or the picture to be intermittently snowy.

Previously, to remedy this condition and to eliminate the intermittent performance of the tuner, it was necessary to remove the individual channel strips to expose the stator contacts. These stator contacts could then be cleaned by rubbing them with a soft cloth and using a tuner cleaner.

My invention is a channel strip that has a felt strip attached to the edge so that as the tuner is rotated, the felt strip rubs against the stator contacts keeping them free from corrosion, tarnish and oxidation. It is recommended that a channel strip corresponding to a channel not used in the specific locality, be removed and this strip with felt attached, be permanently installed in the tuner. It is also recommended that the felt be sprayed with a type of tuner cleaner which will not evaporate, but will remain on the felt strip.

Through normal use of the television tuner and its rotation, the felt strip will provide a continuous cleaning action on the stator contacts, providing for a more stable performance of the tuner, and eliminate the intermittent performance of the television set.

The felt strip is attached to the channel strip by a suitable adhesive.

One type of tuner is illustrated. There may be, however, slight variations of the type of tuner strip employed in a tuner. The principle of the invention of cleaning the stator contacts by a felt strip attached to a tuner strip is applicable to all these regardless of the type of tuner strip used.

The invention will be more clearly understood from the following detailed description having reference to the accompanying drawing in which.

It is conceded that the operating principles of this type of tuner are understood.

Figure 2:
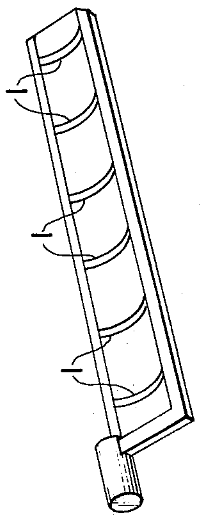
FIG. 2 is a view of the stator assembly removed from the tuner showing the individual stator strips. The stator stator strips are connected to specific circuits in the tuner.
Figure 1:
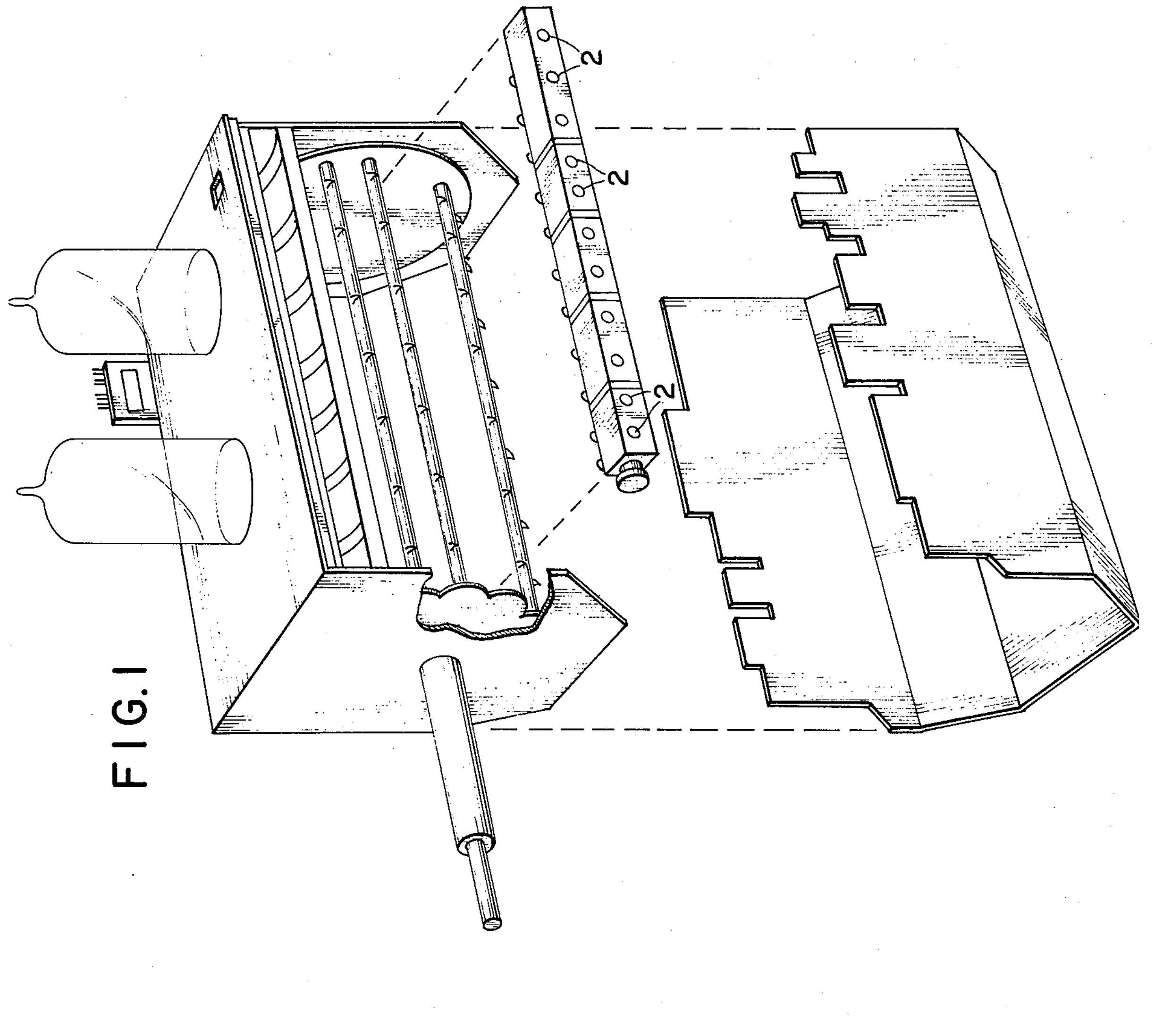
FIG. 1 is a perspective view of a typical television tuner utilizing the rotating barrel, the barrel being made up of individual channel strips each tuned to a specific television frequency.

The stator strips 1 of FIG. 1 and FIG. 2 are connected to specific circuits in the tuner. The lugs on the individual channel strips 2 FIG. 3 connect the tuning circuits specific to each channel which are wound on the individual channel strips.

Tarnish and corrosion of the stator strips results in poor electrical connection between the tuner circuitry and the lugs on the individual channel strips giving an intermittent performance of the tuner and poor picture quality.

Figure 3:
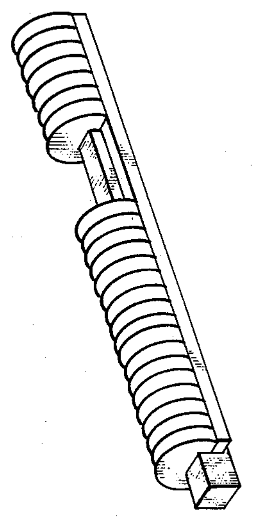
FIG. 3 is a channel strip removed from the tuner of FIG. 1 with the felt covering the strip.

The substitution of a felt covered strip FIG. 3 for a channel strip cleans the stator strips and prevent this tarnish oxidation build-up, and continuous cleaning action takes place when channels are changed by rotating the tuner barrel inasmuch as the felt strip would brush over the stator strips.

The physical shape of the felt covered strip is similar to that of an individual channel strip so that it is mounted and held in the tuner barrel in the same manner as the individual channel strips.

I claim:

1. A stator strip cleaning and wiping device for removing tarnish and corrosion build-up on the stator strips of television tuners comprising a rotary drum having a plurality of peripherally-spaced, longitudinally-extending tuner strips, one for each channel to be tuned, said device comprising a felt-edged strip longitudinally extended and inserted in the rotary drum in a space other than one of said tuned strip channel spaces whereby rotation of said drum provides cleaning and wiping of said stator strips.

2. A stator strip cleaning and wiping device as described in claim 1 wherein said wiping member is of any material whose properties provide for cleaning and wiping action.

* * * * *